United States Patent Office 3,515,616
Patented June 2, 1970

3,515,616
PROCESS FOR BONDING POLYPROPYLENE MATERIALS WITH RUBBERS
Haruo Miyamoto, Hideo Uchida, Katsuhiko Uzawa, and Tsutomu Ohbayashi, Nagoya, Japan, assignors to Mitsubishi Rayon Co., Ltd., Chuo-ku, Tokyo, Japan, a corporation of Japan
No Drawing. Filed Dec. 6, 1966, Ser. No. 599,395
Claims priority, application Japan, Dec. 6, 1965, 40/74,905
Int. Cl. C09j 3/00
U.S. Cl. 156—330    9 Claims

ABSTRACT OF THE DISCLOSURE

The present invention relates to a process for permanently and firmly bonding a polypropylene material with a rubber or an analogue thereof. The adhesive used in bonding the polypropylene material to the rubber is a solution containing at least one member selected from the group consisting of chlorinated, chlorosulfonated, and sulfonated crystalline polyolefins.

---

Polypropylene is generally a very useful material and finds various applications in the form of fiber, film, tape, sheet or the like. However, it has been impossible to satisfactorily bond polypropylene with a rubber since the polypropylene has no functional group in its molecule and it is highly crystalline. Thus, previous conventional adhesives for rubbers such as resorcinol-formaldehyde-vinyl pyridine copolymer latex dispersion have never given a satisfactory adhesive effect to the polypropylene. An adhesive strength of at most 1 to 2 kg./cm. or lower has been obtained even if polypropylene has been bonded with a rubber according to a usual method employing as an adhesive an acrylic resin, a vinyl acetate resin, a melamine resin, a urea resin, an epoxy resin, a coumaroneindene resin, a natural or synthetic rubber resin, an isocyanate resin, an alkyd resin, a ketone resin, a polyamide resin, a polyester resin, a phenol resin, a silicone resin, a styrene resin, a vinyl chloride resin, a vinyl copolymer resin or the like.

U.S. Pat. No. 3,023,126 discloses a process for bonding a polyester material, which is as comparatively difficult to bond as a polypropylene material, with another material using an isocyanate resin as an adhesive. Even if this process is applied to a polypropylene material, a practical adhesive strength can not be obtained. As used herein, the term practical adhesive strength is meant one of such a high level that no releasing occurs even in a prolonged and severe use such as a tire cord, a conveyor belt, a rubber life-boat or the like. Polypropylene materials therefore, have been of no practical use owing to their poor adhesive property, although they have excellent mechanical properties, a water resisting property, chemical resistance and a low specific gravity and they have many merits as a reinforcing material for rubbers.

It has been known to employ such a modified polyolefin as a chlorinated polyolefin, a chlorosulfonated polyolefin or the like as a pretreating agent for a polypropylene material in order to obviate the above-mentioned defects. For example, German Pat. No. 1,114,603 discloses that a high pressure process polyolefin which has been chlorinated as highly as possible is a suitable adhesive for a polyolefin, a metal, paper, rubber, stone and ceramic products. The chlorinated polyolefin is essentially adhesive, but its cohesive force is so low that the bond between a polypropylene material and a rubber may be only slightly improved by the use of the chlorinated polyolefin compared with the bond obtained by using any of the above-mentioned resins. The chlorinated polyolefin is still far from a practical adhesive.

It is therefore the principal object of the present invention to provide a process for permanently and firmly bonding a polypropylene material with a rubber or an analogue thereof.

It is another object of the present invention to provide a process for obtaining an excellent bond between a polypropylene material and a rubber without sacrificing the excellent properties of the polypropylene.

These and other objects and advantages of the invention will appear from the following description of the invention.

In view of the fact that the above-mentioned modified polyolefin is compatible with both polypropylene materials and rubbers, we have carried out an extensive study of the process for bonding polypropylene materials with rubbers. We have now found that an excellent bond between a polypropylene material and a rubber can be obtained by employing as an adhesive at least one member selected from the group consisting of crystalline chlorinated, chlorosulfonated and sulfonated polyolefins.

When such a modified polyolefin is used as an adhesive for a polypropylene material and a rubber, the modified polyolefin does not react with polypropylene. Therefore an adhesion based upon chemical bond can not be obtained. If the polypropylene material is treated with the modified polyolefin by any suitable method and a rubber is affixed to the treated polypropylene material by coating topping, laminating or any other method and an adhesion between the polypropylene material and the rubber is then effected at the same time as a cure of the rubber, the modified polyolefin melts under the cure condition and is then dissolved in both the polypropylene materials and the rubber. It is therefore possible to obtain a firmer adhesion than any other physical one.

Such a modified high pressure process polyolefin as disclosed in the above-mentioned German Pat. No. 1,114,603, however, has not a sufficiently great adhesive strength because it has a low cohesive force as mentioned above and cohesion rupture occurs at the adhesion layer. In physical adhesion, if the cohesive force of an adhesive is too large, the materials to be bonded and the adhesive have generally a tendency to separate at their interface and a great adhesive strength can not be obtained.

Unexpectedly we have now found that the higher the cohesive force of a modified polyolefin is, the firmer adhesive strength can be obtained, provided that a rubber compounding condition and a cure condition are suitably selected. Based upon this discovery the present invention has been completed.

According to the present invention, a crystalline polyolefin is modified, under such a condition that the crystallinity of the polyolefin may not be destroyed, to increase the cohesive force of the polyolefin. When a modified crystalline polyolefin such as modified low pressure process or medium pressure process polyethylene or modified isotactic or syndiotactic polypropylene is used as an adhesive between a polypropylene material and a rubber, a far higher adhesive strength can be obtained than that obtained by the use of a modified noncrystalline polyolefin such as modified high pressure process polyethylene or modified atactic polypropylene. It is therefore one of the required conditions of the present invention to use a modified crystalline polyolefin as an adhesive.

When at least one thermosetting resin selected from the group consisting of resorcinol-formaldehyde-latex dispersions, isocyanate resins and epoxy resins is used together with such a modified crystalline polyolefin, a further higher adhesive strength can be obtained by their synergistic effect.

When a natural or synthetic rubber is used together with the modified crystalline polyolefin, the compatibility between the adhesive and the substrates can be increased and adhesive property is improved.

Thus, it is another condition of the present invention necessary to improve adhesive strength to use at least one member selected from the group consisting of thermosetting resins and natural and synthetic rubbers, together with a modified crystalline polyolefin.

The adhesive property of the modified crystalline polyolefin is related to both the crystallinity and degree of modification of the polyolefin. The degree of modification should be determined according to the polarities of the polypropylene material and the rubber to be bonded. For a given degree of modification, the higher the crystallinity of the polyolefin becomes, the more its adhesive property is improved. We have now found that a bond between a polypropylene material and a rubber is more closely related to the crystallinity of the modified polyolefin than to its degree of modification. It may be preferable to modify a crystalline polyolefin under such a condition that the crystallinity of the polyolefin may be improved even at the sacrifice of its degree of modification. The crystallinity must be at least 5 percent.

When a polyolefin, for example, such as a medium pressure process or low pressure process polyethylene is modified by chlorination, the crystallinity of the polyolefin is lowered as a degree of chlorination is increased. If the degree of chlorination exceeds about 60 percent by weight, the crystallinity is completely lost. An isotactic polypropylene has the same tendency. At a given degree of modification, however, it is possible to vary the crystallinity of the polyolefin considerably by suitably selecting the reaction condition.

The crystal structure of a polyolefin is not generally converted into a new structure by modification, but its original crystal structure is retained after modification. It is therefore desirable to selectively modify only the amorphous part of a starting polymer. The modification may be carried out by chlorination, chlorosulfonation or sulfonation.

If a polymer is modified by a solid phase reaction, the crystallinity of the polymer is generally retained, but the polymer is heterogeneously modified. Therefore the solubility of the resultant modified polymer in a solvent is so poor that special apparatuses or processes are required to obtain effective adhesion. In the process of the present invention, it is desirable to carry out the modification under a condition which approximates to a swelled state in order to prevent the remarkable reduction of the crystallinity of the polyolefin. Therefore, it is preferable to employ solvents having a poor ability to dissolve the polyolefin. It is also desirable to modify the polyolefin at a lower temperature. The use of such a catalyst as benzoyl peroxide should be avoided since it causes the reduction of the crystallinity of the polyolefin.

For example, when an isotactic polypropylene is chlorinated in toluene by blowing chlorine gas into the mixture to a degree of chlorination of 20 percent by weight, the reaction at 120° C. gives a product of a low crystallinity or an amorphous product while the reaction at 90° C. gives a product of a high crystallinity. If each of these products are used as an adhesive, there is a remarkable difference between the adhesive strength between them.

The modified crystalline polyolefins include chlorination, chlorosulfonation and sulfonation products of crystalline polyolefins such as low pressure process or medium pressure process polyethylenes, isotactic or syndiotactic polypropylenes obtained by a polymerization with a Ziegler catalyst and polybutylenes, etc. Among them chlorinated crystalline polyethylenes and polypropylenes having a crystallinity of at least 5 percent, preferably not lower than 20 percent, are preferable owing to their coat strength and crystal structure.

Such isocyanate resins as 2,4-chlorophenylene diisocyanate, p,p'-diphenylmethane diisocyanate, p,p',p''-triphenylmethane triisocyanate, 1,5-naphthylene diisocyanate and polymethylene diisocyanates such as ω,ω'-(ditrimethylenethioether)-diisocyanate and hexamethylene diisocyanate show the most remarkable synergistic effect when they are employed together with the modified crystalline polyolefins. The amount of such isocyanate resins employed may be not less than 0.1 percent by weight, preferably 0.5 to 5 percent by weight, of the modified polyolefin. The use of more isocyanate resins is of course effective, but gives substantially no additional industrial merit.

According to the present invention, a modified polyolefin and an isocyanate resin are advantageously dissolved in such a common solvent as toluene, perchloroethylene or trichloroethylene, if necessary, at an elevated temperature. A polypropylene material is then pre-treated with the resulting solution, and a rubber is applied to the material thus treated. The whole is then subjected to a bonding procedure. The above isocyanate resin may be replaced by an epoxy resin. The epoxy resin may be either of a glycidyl type such as an aromatic diglycidyl ether of bisphenol A or an aliphatic diglycidyl ether of bisphenol A or of a non-glycidyl type such as an acyclic or cyclic aliphatic epoxide, but the former is preferably used. The amount of the epoxy resin employed may be not less than 0.1 percent by weight, preferably 5 to 10 percent by weight of the modified polyolefin. Otherwise the same may be said of this case as in the above-mentioned isocyanate resins.

Latices which may be used in the resorcinol-formaldehyde-latex dispersion of the present invention include such synthetic rubber copolymer latices as a styrene-butadiene copolymer latex, a vinylpyridine-styrene-butadiene terpolymer latex, an acrylonitrile-butadiene copolymer latex and a monochlorobutadiene polymer latex. Any of these latices is mixed with a resorcinol-formaldehyde solution and the pH of the mixture is adjusted to 8.5 to 9.5 according to an usual method. In order to obtain a best adhesive property by the use of such a dispersion and a modified polyolefin, a polypropylene material is first treated with the resorcinol-formaldehyde-latex dispersion and is dried. The treated polypropylene material is then coated with a solution of the modified polyolefin in such a solvent as toluene, perchloroethylene or trichloroethylene and is dried. A rubber is then applied to the coated material and the whole is subjected to a bonding procedure. Alternatively, a modified polyolefin emulsion may be mixed with the resorcinol-formaldehyde. In the case care must be taken against a generally poor stability of the modified polyolefin emulsion on an alkaline side.

When the above resorcinol-formaldehyde-latex dispersions, isocyanate resins or epoxy resins are used together with modified crystalline polyolefins, a synergistic effect is given to the adhesive property of the polyolefins. The use of such thermosetting resins is also effective in increasing the thermal resistance of the resultant bond.

Natural and synthetic rubbers can be also effectively used together with the modified crystalline polyolefins. Such rubbers include natural rubber, styrene-butadiene rubbers, chloroprene rubber, isoprene, rubber, isobutylene-isoprene rubbers, acrylonitrile-butadiene rubbers, chlorinated natural rubbers and the like. Among them chloroprene rubber, natural rubber, styrene-butadiene rubbers, chlorinated natural rubbers and acrylonitrile-butadiene rubbers are particularly preferably used since they are compatible with the modified polyolefin.

In the practice of the process of the present invention, a rubber is first masticated and, if necessary, a vulcanizing agent, a vulcanizing accelerator and the like are compounded into the rubber. The rubber thus treated and a modified polyolefin are dissolved in a common solvent. A polypropylene material is pre-treated with the resultant solution and a rubber is applied to the treated material either by heating or with a commercially available rubber adhesive, and the whole is preferably subjected to a bonding procedure. The amount of the rubber compounded into the modified polyolefin may be within a range of 0.1 to 20 percent by weight, preferably 5 to 10 percent by weight. The use of such a rubber is advantageous in that it can also give a product having a soft temper.

When a modified polyolefin is used alone or together with a resin or rubber, a thermal stabilizer such as dibutyl tin dilaurate, dibutyl tin maleate, lead stearate or the like, a light stabilizer such as benzophenone or carbon black, a viscosity modifier such as stearic acid or a resin and any other third material may be added to the modified polyolefin to such a degree that it may be no obstacle to the adhesive property of the polyolefin.

A process for bonding a polypropylene material with a rubber with any of the above-mentioned various combinations of the adhesives depends upon the resin or rubber employed together with a modified polyolefin. The most effective process comprises treating a polypropylene material with a solution of the modified polyolefin in an organic solvent or a solution of the modified polyolefin and a resin or rubber in a common organic solvent by dipping, coating, spreading or the like procedure and then drying the treated material at a temperature lower than 100° C. Alternatively, a previously masticated rubber may be treated with the above-mentioned solution by dipping, coating or spreading. If a polyolefin is modified in a solid state, the product is sparingly soluble in a solvent. The modified polyolefin may be spreaded in the form of finely divided powder on a polypropylene material. When a resorcinol-formaldehyde-latex dispersion is used together with a modified polypropylene, a two stage process may be carried out as described above. When another resin is used together with the modified polyolefin, the two stage process may be also carried out although the process becomes complex.

The amount of these adhesives deposited may be not larger than 30 percent by weight of the dry weight of the polypropylene material. The use of a larger amount of the adhesives is substantially worthless. A particularly preferable range is 10 percent to 20 percent by weight.

After a polypropylene material has been previously treated with such adhesives, a rubber may be applied to the treated material by any customary process such as laminating, coating, topping or the like procedure. The rubber curing temperature at the bonding stage may be 80° to 160° C., preferably 100° to 155° C. Here, a temperature higher than 160° C. injures the quality of the polypropylene material, while a temperature lower than 80° C. prolongs the curing time to such a degree that this process may become unsuitable for a commercial purpose. When the modified polyolefin base adhesives of the present invention are used, the higher the curing pressure is, the better result is obtained. The pressure may be not lower than 5 kg./cm.².

The polypropylene materials which can be bonded with a rubber according to the process of the present invention include molded article containing non-modified or modified polypropylene, for example, such as fiber monofilaments, tapes, split fibers, knitted fabrics, yarns, cords, films, sheets or the like.

As mentioned above, a high level of permanent adhesive strength can be obtained without sacrificing the excellent mechanical properties, water resisting property and chemical resistance of polypropylene, when the adhesives of the present invention are used for bonding a polypropylene material with a rubber. Thus the present invention permits polypropylene to go into the industrial material field and may be of service to the future development in the art.

The following examples are illustrative only of the present invention and should not be construed as limiting the scope thereof, which is properly delineated in the appended claims.

EXAMPLE 1

Pylen (a polypropylene fiber manufactured by Mitsubishi Rayon K.K.) 680 deniers/120 filaments/4 long fibers plain fabric consisting of 55 warps/5 cm. and 17 wefts/5 cm. was coated with solutions of four chlorinated polyolefins A, B, C and D, shown in Table 1 in trichloroethylene, respectively and was then dried at 80° C. for 5 minutes. The amount of these resins deposited was about 10 percent by weight of the fabric.

A sheet having a thickness of 0.5 mm. was then made from a rubber compound consisting of:

| | Parts by weight |
|---|---|
| Natural rubber | 50 |
| A styrene-butadiene rubber | 50 |
| Sulfur | 2.3 |
| Dibenzothiazyl disulfide | 1.1 |
| Stearic acid | 2.5 |
| Zinc white | 4.0 |
| Pine tar | 7.5 |
| Carbon black | 40 |

This sheet was put between two pieces of the above-mentioned coated plain fabric, and the whole was subjected to a heat treatment for 30 minutes at 130° C. and a pressure of 20 kg./cm.² with a vulcanizing press. The assembly thus bonded was allowed to stand for 24 hours in an atmosphere at 20° C. having a relative humidity of 65 percent. A specimen having a width of 25 mm. taken from each bonded assembly was subjected to a friction test. Thus the specimen was put between two pieces of fabric and was released at a release angle of 180° and a pulling velocity of 50 mm./min. to measure the adhesive strength of the specimen. The result of these measurements are shown in Table 1.

TABLE 1

| No. | Adhesives | Starting polymer | Deg. of chlorination (percent) | Crystallinity (percent) | Adhesive strength (kg./cm.) |
|---|---|---|---|---|---|
| A | Chlorinated polyethylene. | High pressure process polyethylene. | 25 | 0 | 2.0 |
| B | do | Low pressure process polyethylene. | 25 | 54 | 6.5 |
| C | Chlorinated polypropylene. | Atactic polypropylene. | 18 | 0 | 3.0 |
| D | do | Isotactic polypropylene. | 18 | 41 | 7.6 |

NOTE.—1. The degree of chlorination was measured by combustion analysis. 2. The crystallinity was measured by X-ray diffraction method. 3. These chlorinated polyolefins were obtained by blowing chlorine gas into a mixture of the corresponding starting polymer and trichloroethylene at 90° C. and precipitating the chlorination product with isopropanol and then washing the product thoroughly.

It is apparent from the above results that crystalline chlorinated polyolefins are effective adhesives, because crystalline chlorinated polyolefins B and D have a far higher adhesive strength than amorphous chlorinated polyolefins A and C.

EXAMPLE 2

The same polypropylene plain fabric as employed in Example 1 was coated with a mixture of 100 parts of a solution of the crystalline chlorinated polypropylene D as employed in Example 1 in trichloroethylene having a resin content of 14 percent and one part of Desmodur R (a triphenylmethanetriisocyanate resin manufactured by Bayer A.G.) and was then dried. The amount of these resins deposited was 12 percent. The same rubber compound sheet as employed in Example 1 was then put between two pieces of the above-mentioned coated plain fabric, and the whole was subjected to a heat treatment for 30 minutes at 130° C. and a pressure of 20 kg./cm.²

The adhesive strength of the resultant bonded assembly F was measured by the same test as in Example 1. The result of the test is shown in Table 2, in which the results for the use of the chlorinated polypropylene D or Desmodur RE alone are also shown as controls.

TABLE 2

| No. | Adhesives | Adhesive strength (kg./cm.) |
|---|---|---|
| D | Crystalline chlorinated polypropylene | 7.6 |
| E | Desmodur R | 1-2 |
| F | Crystalline chlorinated polypropylene and Desmodur R | 14.0 |

It is apparent from the above results that the adhesive property of the crystalline chlorinated polypropylene is remarkably improved by employing an isocyanate resin together with the polypropylene. Therefore, the adhesive F is preferably applied to such a use as in a strong conveyor belt which requires a high adhesive strength.

EXAMPLE 3

The same polypropylene plain fabric as employed in Example 1 was padded with a resorcinol-formaldehyde-latex solution obtained by mixing 125 parts of Hycar Latex 2508 FS (a vinylpyridine-styrene-butadiene terpolymer latex manufactured by Nippon Geon Co.) with 171 parts of an aged resorcinol-formaldehyde solution and was dried at 60° C. The padded fabric was then coated with a solution of the crystalline modified polyolefin as shown in Table 3 in toluene having a resin content of 15 percent. The amount of these resins deposited was about 15 percent. The treated fabric was bonded with a rubber in the same manner as in Example 1. The adhesive strength of the resultant bonded assembly H is shown in Table 3, in which the results for the use of the chlorinated polypropylene or the resorcinol-formaldehyde-latex dispersion G alone are also shown as controls. The temper of the resultant bonded assembly was also soft and good.

TABLE 3

| No. | Adhesives | Adhesive strength (kg./cm.) |
|---|---|---|
| D | Crystalline chlorinated polypropylene | 7.6 |
| G | Resorcinol-formaldehyde-latex dispersion | 2.0 |
| H | Crystalline chlorinated polypropylene and resorcinol-formaldehyde-latex dispersion | 15.3 |

EXAMPLE 4

A polypropylene plain fabric was bonded with a rubber in the same manner as in Example 1. The adhesive strength of the resultant bonded assembly was also measured.

The adhesive employed was a mixture of 100 parts of a solution of a chlorinated isotactic polypropylene in toluene having a resin content of 15 percent and 3 parts of Esdyne 3100 (an epoxy resin manufactured by Sekisui Kagaku Kogyo K.K.). The chlorinated polypropylene was prepared by blowing chlorine gas into a solution of an isotactic polypropylene in carbon tetrachloride at a temperature of 110° C. to obtain a modified polypropylene having a degree of chlorination of 20 percent and a crystallinity of 23 percent. The modified polyolefin was precipitated with isopropanol and was thoroughly washed.

The result of this example is shown in Table 4.

TABLE 4

| No. | Adhesives | Adhesive strength (kg./cm.) |
|---|---|---|
| I | Chlorinated polypropylene (crystallinity of 23%) | 7.0 |
| J | Esdyne 3100 | 2.0 |
| K | Chlorinated polypropylene and Esdyne 3100 | 11.5 |

It is apparent from the above table that the adhesive strength of the resultant bonded assembly is further improved by a synergistic effect when a crystalline chlorinated polypropylene is used together with an epoxy resin.

EXAMPLE 5

A polypropylene plain fabric was bonded with a rubber in the same manner as in Example 1. The adhesive strength of the resultant bonded assembly was also measured.

The adhesive employed were a series of mixtures of a solution of the chlorinated polyethylene B as employed in Example 1 in toluene having a resin content of 15 percent and the commercially available solvent type natural or synthetic rubber adhesives as shown in Table 5, a ratio of the chlorinated polyethylene to the adhesives as a solid content being 10:1.

The results of this example are shown in Table 5.

TABLE 5

| No. | Adhesives | Adhesive strength (kg./cm.) |
|---|---|---|
| B | Crystalline chlorinated polyethylene | 6.5 |
| L | Natural rubber | 1.0 |
| M | Acrylonitrile-butadiene rubber | 1.5 |
| N | Chloroprene rubber | 1.5 |
| O | Isobutylene-isoprene rubber | 1.5 |
| P | Natural rubber and crystalline chlorinated polyethylene | 9.1 |
| Q | Acrylonitrile-butadiene rubber and crystalline chlorinated polyethylene | 9.6 |
| R | Chloroprene rubber and crystalline chlorinated polyethylene | 9.5 |
| S | Isobutylene-isoprene rubber and crystalline chlorinated polyethylene | 9.8 |

The above results show that the polypropylene fabric can not be bonded with the rubber by using any rubber adhesive, but that a firmly bonded assembly having a soft and good temper can be obtained by the use of the crystalline chlorinated polyethylene and any rubber adhesive.

EXAMPLE 6

The procedures of Example 5 were repeated except replacing the crystalline chlorinated polyethylene by the crystalline chlorinated polypropylene D as employed in Example 1. The results of this example are shown in Table 6. The adhesive strength of the resultant bonded assembly was remarkably improved by the use of the crystalline chlorinated polypropylene and any rubber adhesive.

TABLE 6

| No. | Adhesives | Adhesive strength (kg./cm.) |
|---|---|---|
| D | Crystalline chlorinated polypropylene | 7.6 |
| L | Natural rubber | 1.0 |
| M | Acrylonitrile-butadiene rubber | 1.5 |
| N | Chloroprene rubber | 1.5 |
| Q | Isobutylene-isoprene rubber | 1.5 |
| T | Natural rubber and crystalline chlorinated polypropylene | 10.5 |
| U | Acrylonitrile-butadiene rubber and crystalline chlorinated polypropylene | 11.0 |
| V | Chloroprene rubber and crystalline chlorinated polypropylene | 10.8 |
| W | Isobutylene-isoprene rubber and crystalline chlorinated polypropylene | 11.2 |

What we claim is:

1. A process for bonding a polypropylene material with a rubber which comprises coating the surface of the polypropylene material with a treatment solution containing at least one member selected from the group consisting of chlorinated, chlorosulfonated and sulfonated crystalline polyolefins having a degree of crystallization of at least 5%, bringing the thus treated surface into contact with the rubber, and then applying a pressure of at least 5 kg./cm.² thereto at a temperature of 80° to 160° C. for a period of time sufficient to effect curing, thereby forming a strong bond between said polypropylene material and said rubber.

2. A process according to claim 1, wherein said treatment solution further contains a resorcinol-formaldehyde-latex dispersion.

3. A process according to claim 1, wherein the surface of the polypropylene material is coated with a resorcinol-formaldehyde-latex dispersion prior to coating with the treatment solution.

4. A process according to claim 1, wherein the treatment solution further contains an isocyanate resin.

5. A process according to claim 1, wherein the treatment solution further contains an epoxy resin.

6. A process according to claim 1, wherein the treatment solution further contains a natural or synthetic rubber.

7. A process according to claim 1, wherein said chlorinated crystalline polyolefin is a chlorinated crystalline polypropylene.

8. A process according to claim 1, wherein said chlorinated crystalline polyolefin is a chlorinated crystalline polyethylene.

9. A process for bonding a polypropylene material with a rubber which comprises coating the surface of the polypropylene material with a treatment solution containing at least one member selected from the group consisting of chlorinated crystalline polypropylene and polyethylene having a degree of crystallization of at least 5% and at least one member selected from the group consisting of a resorcinol-formaldehyde-latex dispersion, an isocyanate resin, an epoxy resin and a natural or synthetic rubber, bringing the thus treated surface into contact with a rubber, and then applying a pressure of at least 5 kg./cm.² thereto at a temperature of 80° to 160° C. for a period of time sufficient to effect curing, thereby forming a strong bond between said polypropylene material and said rubber.

References Cited

UNITED STATES PATENTS

| | | | |
|---|---|---|---|
| 2,981,650 | 4/1961 | Bäder et al. | 156—333 X |
| 3,075,857 | 1/1963 | Fior | 156—334 X |
| 3,157,564 | 11/1964 | Tucker | 161—243 |
| 3,179,554 | 4/1965 | Karcher et al. | 156—333 X |
| 3,260,641 | 7/1966 | Falcone | 156—333 X |
| 3,303,082 | 2/1967 | Wilson | 156—334 X |
| 3,333,025 | 7/1967 | Bader | 156—333 X |

CARL D. QUARFORTH, Primary Examiner

S. J. LECHERT, Jr., Assistant Examiner

U.S. Cl. X.R.

156—330, 331, 333, 334, 335; 161—184, 241, 242, 248, 254, 255; 260—29.3, 29.7, 30.8, 32.4, 32.8, 33.6, 33.8